Oct. 17, 1967 D. S. STACEY 3,348,049
HIGH SPEED ULTRAVIOLET THIN SPOT DETECTOR
Filed Dec. 31, 1964 5 Sheets-Sheet 1

FIG. 1

INVENTOR.
DAVID S. STACEY
BY
ATTORNEY

INVENTOR.
DAVID S. STACEY
BY
ATTORNEY

Fig. 7

Patented Oct. 17, 1967

3,348,049
HIGH SPEED ULTRAVIOLET THIN
SPOT DETECTOR
David Stearns Stacey, Boulder, Colo., assignor to Ball
Brothers Research Corporation, Boulder, Colo., a corporation of Colorado
Filed Dec. 31, 1964, Ser. No. 422,816
11 Claims. (Cl. 250—83.3)

ABSTRACT OF THE DISCLOSURE

A device and method for determining thickness variations in a transparent or semi-transparent material. A light beam is directed at one side of the material and a portion of the beam is received at the other side, the received portion being converted into a voltage indicative of the instantaneous intensity of the beam, with the conversion being controlled by a difference voltage generated by comparing a reference voltage and a voltage that is indicative of the average intensity of the light beam over a predetermined period of time.

This invention relates to the inspection of transparent and semi-transparent material and more particularly to a new and improved method and apparatus for inspecting the thickness of a workpiece.

It is often important that workpieces of a given type be inspected to determine the presence of thick or thin spots. For example, when transparent or semi-transparent workpieces such as containers or bottles made of siliceous or polymeric materials are formed, as by some type of blow molding process, the material comprising the sidewall of the container is more stretched and normally thinner than other material in the article. Therefore, avoid weaknesses and possibly defective containers, it is important that the sidewalls of such containers be inspected. This has become increasingly important in recent years since the industrial trend has been to produce a larger percentage of nonreturnable containers or bottles; that is, bottles such as beer bottles which are designed for only one use or one circulation to the consumer and therefore have a greatly diminished wall thickness, on the order of 0.050 to 0.075 inch.

Many methods have been employed in the past for inspecting material or portions of workpieces to determine whether thin or thick spots were present therein. At least one of these methods has involved determining the thickness of material by measuring the amount of light or other radiation absorbed by the material or by measuring the amount of such light or other radiation transmitted through material. However, several problems have been encountered with this method.

It is a known fact that the light sources employed vary a great deal in intensity over a relatively long period of time and result in inaccurate measurements and faulty determinations of thin spots being made by such inspection equipment, unless the measuring instrument is constantly recalibrated. Furthermore, it is well known that the composition of the material in a workpiece being inspected has a great deal to do with the amount of such light or the radiation which is absorbed by the material and this, likewise, can result in erroneous results. For example, elements such as iron are often found in the silica or other ingredients used to form glass. A certain amount of iron is always present in the starting materials used to produce a batch of glass in a furnace and it would be prohibitively expensive to remove this impurity.

In the mixing of glass in a glass furnace, it is often difficult to control the percentage of certain elements in the raw material fed into the furnace charge. The presence of these elements such as iron in the glass has a tremendous effect on the amount of light absorbed by the glass. However, the percentage of these elements in the glass changes gradually over a period of time due to many factors, such as circulation within the glass furnace and the nature of ingredients added to the glass batch. When the amount of iron in the glass comprising the finished containers changes, the amount of light absorbed by the walls of such containers also changes. This results in a faulty indication of a thin spot unless some correction can be made to indicate that this absorption is due to impurities in the glass or to a variable light source rather than to an actual thin spot. Thus, in the past, when light such as ultraviolet light has been used to determine the thickness of material, it has been impossible to determine reliably whether the differences observed in the light absorbed by the material have been due to varying material thickness or to absorption of the light by impurities in the siliceous or polymeric material or to variations in the intensity of the light source employed.

Thus, it is an object of the present invention to provide a new and improved method and apparatus for inspecting the thickness of transparent and semi-transparent materials.

It is an additional object of the present invention to provide a new and improved thin spot detector.

It is a further object of the present invention to provide a method and apparatus for inspecting the thickness of material which compensates for variations in the intensity of a light source and variations in composition of the material occurring over a relatively long period of time.

It is an additional object of the present invention to provide new and improved circuitry for use in glassware inspection equipment, which circuitry continuously recalibrates the inspection system by using the average of the measurements made over a previous period of time.

Another object of the present invention is to provide a method and apparatus for inspecting the thickness of portions of articles at high speeds and over large areas directly on a production line.

It is another object of the invention to provide a method and apparatus for inspecting the thickness of portions of articles without damaging the articles themselves.

It is also an object of this invention to provide a new and improved method and apparatus for continuously inspecting the thickness of the sidewalls of containers made of polymeric or siliceous material while such containers are on the production line, for indicating the presence of thin spots and thick spots in the container, and for rejecting the faulty container from the production line.

Additional objects and advantages of the present invention will be apparent from the following detailed description of the invention, when read with the appended drawings, in which:

In accordance with the invention, means are provided for directing a light beam toward a given piece of transparent or semi-transparent material, arranged to cooperate with means for receiving the light beam which passes through the material and for converting the received light beam into a first voltage indicative of the instantaneous intensity of the light passing through the material. Additional means are provided for creating relative motion between the material and the light beam. Further means are provided for generating a second voltage indicative of the average intensity of the received light beam over a preselected period of time, and means are provided for comparing the second voltage with a fixed voltage so as to generate a difference voltage. In addition, means are provided for controlling the conversion of the received light beam into the first voltage with the difference voltage and, finally, means are provided for monitoring the first voltage to determine whether it falls outside of a preselected range thereby indicating the presence of a thin spot.

Further in accordance with the invention, a method for detecting thin spots in transparent and semi-transparent material is provided including the steps of directing a light beam toward a piece of transparent or semi-transparent material, creating relative motion between the material and the light beam, receiving the light beam which passes through the material, converting the received light beam into a first voltage indicative of the instantaneous intensity of the light passing through the material, generating a second voltage indicative of the average intensity of the received light beam over a previous preselected period of time, comparing the second voltage with a fixed voltage so as to generate a difference voltage, and monitoring the first voltage to determine whether it falls outside of a preselected range thereby indicating the presence of a thin spot.

Figure 1:
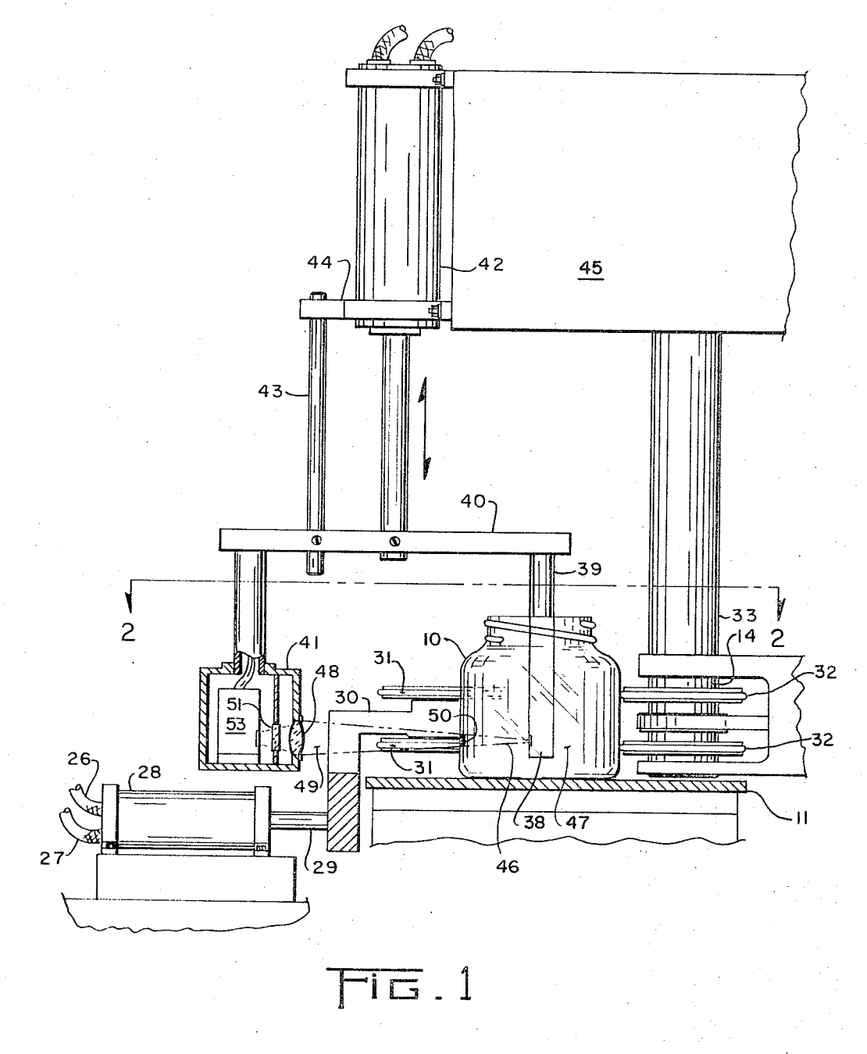
FIGURE 1 is an elevation view of one embodiment of the inspection equipment of the present invention.
Figures 2, 3, 4:
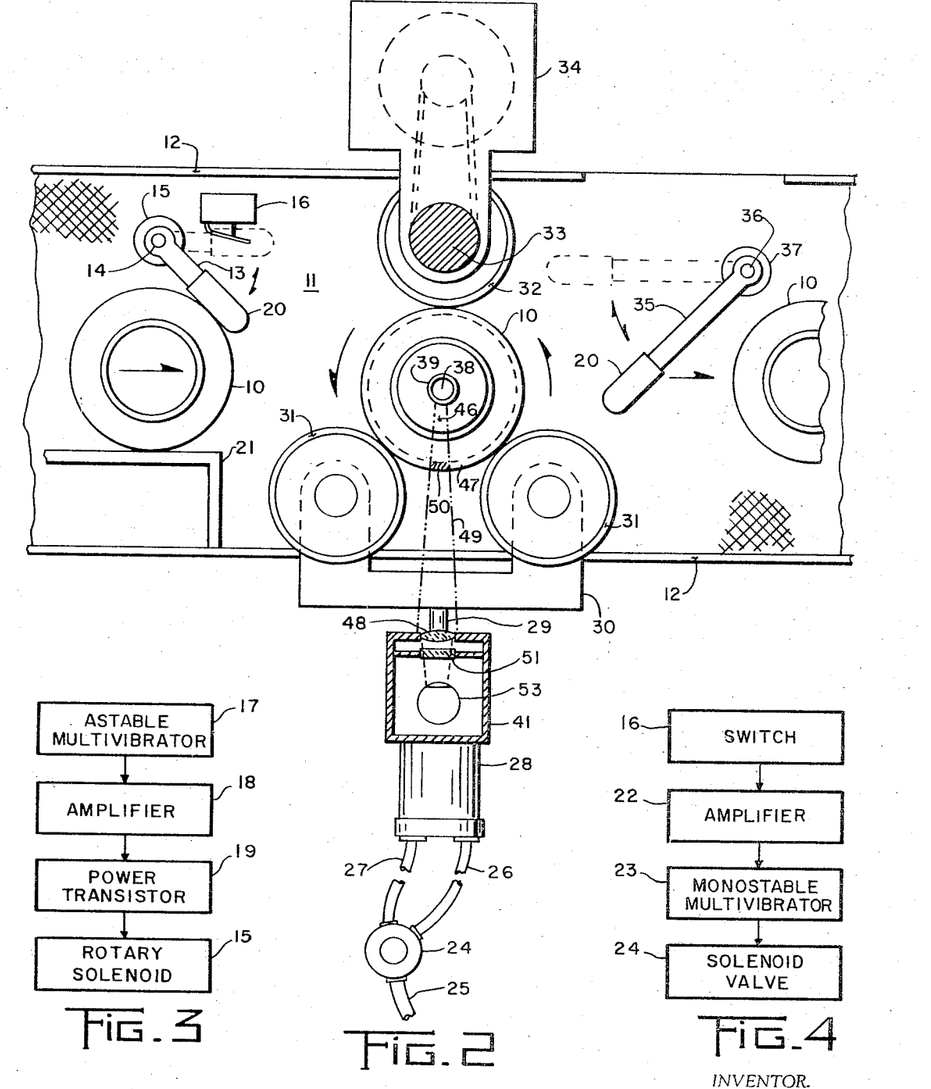
FIGURE 2 is a plan view of the equipment shown in FIGURE 1.
FIGURE 3 is a schematic block diagram of a timing device employed with the apparatus shown in FIGURES 1 and 2.
FIGURE 4 is a schematic block diagram of a signal delay device employed in the invention.

Referring to the drawings, in FIGURES 1 and 2, glass containers 10 are shown positioned on an endless conveyor belt 11 having a substantially smooth surface. Guard rails 12 prevent the containers from falling off the belt 11. The conveyor belt 11 is preferably operated at a fairly constant speed without interruption and, when operated without interruption, the forward motion of the container 10 is arrested by an indexing arm 13 located over the belt 11. Indexing arm 13 is mounted for oscillatory motion on the shaft 14 of a D.C. rotary solenoid 15. Indexing arm 13 is shown in its container-arresting position in FIGURE 2 in solid lines and in its actuated position in broken lines. The operation of the solenoid is controlled by a signal from a timing device such as that shown in FIGURE 3, described below. Indexing arm 13 is arranged to operate a microswitch 16 as it moves into its actuated position. Microswitch 16 is connected to terminal 152 of averaging circuit 146 shown in FIGURE 8 and serves to actuate other circuitry to be described which is used to examine container 10 after it passes through indexing arm 13.

In accordance with the block diagram of FIGURE 3, a pulse from an astable multivibrator 17 is used to apply a voltage through a driver stage comprising an amplifier 18 and a power transistor 19 to the rotary solenoid 15. Passing the pulse through the driver stage is required to develop sufficient current so that D.C. rotary solenoid 15 will be fully energized.

The portion of the indexing arm 13 that comes into contact with the containers 10 is preferably covered with a non-abrasive material 20, such as any one of several rubber or plastic compounds, to minimize any damage to the containers. An adjustable section 21 of the guard rail is used to restrict the flow of containers 10 past indexing arm 13 to one at a time. The rate at which containers are processed through the inspection apparatus is controlled by the astable multivibrator 17 acting through the indexing arm 13. This rate should not exceed the maximum rate at which the apparatus can handle the containers and preferably is slightly less than the latter.

After the container 10 has passed by the indexing arm 13, it moves along belt 11 until it reaches the correct position for rotation. In accordance with the block diagram of FIGURE 4, microswitch 16 also passes a signal through an amplifier 22 and actuates a monostable multivibrator 23. Monostable multivibrator 23 delays further transmission of the signal until the container has reached the correct position along the belt 11 for rotation and inspection. The amount of delay may be easily adjusted to meet varying operational requirements and is set to permit a container 10 to reach the inspection station. At the end of the delay period, multivibrator 23 reverts to its normal state and the trailing edge of the pulse generated is used to actuate a D.C. rotary solenoid valve 24 which thus controls the length of time a container 10 is rotated.

Solenoid valve 24 is arranged to control the feeding of fluid pressure, such as compressed air in pressure line 25, through either fluid line 26 or fluid line 27 to a double-action air cylinder 28. Double-action air cylinder 28 has a piston 29 mounted for translatory movement across the belt and connected to a support arm 30 which has mounted on one end thereof two sets of vertically spaced-apart idler wheels 31 disposed above and longitudinally along belt 11. Actuation of double-action air cylinder 28 results in the two sets of idler wheels 31 engaging container 10 and moving said container in a direction transverse to the path of movement of belt 11 into contact with two vertically spaced-apart rotating wheels 32 mounted on shaft 33.

Although a single driving or rotating wheel will suffice, two spaced-apart driving wheels are preferably used since increased container stability is thereby obtained. The spaced-apart wheels are preferably driven at a fairly constant speed without interruption and by any suitable means, such as a motor 34, the speed of rotation being dependent in part upon the size of the container being inspected. Rotation speeds of about 800 to 1,000 revolutions per minute have been used; however, other speeds may be used if desired. Since the conveyor belt 11 normally continues to move even when a container 10 is being rotated, it is desirable that the surface of the conveyor belt which is in contact with the base of the container be fairly smooth in order to minimize any tendency of the container to move out of alignment or wobble during the inspection process.

Figure 7:
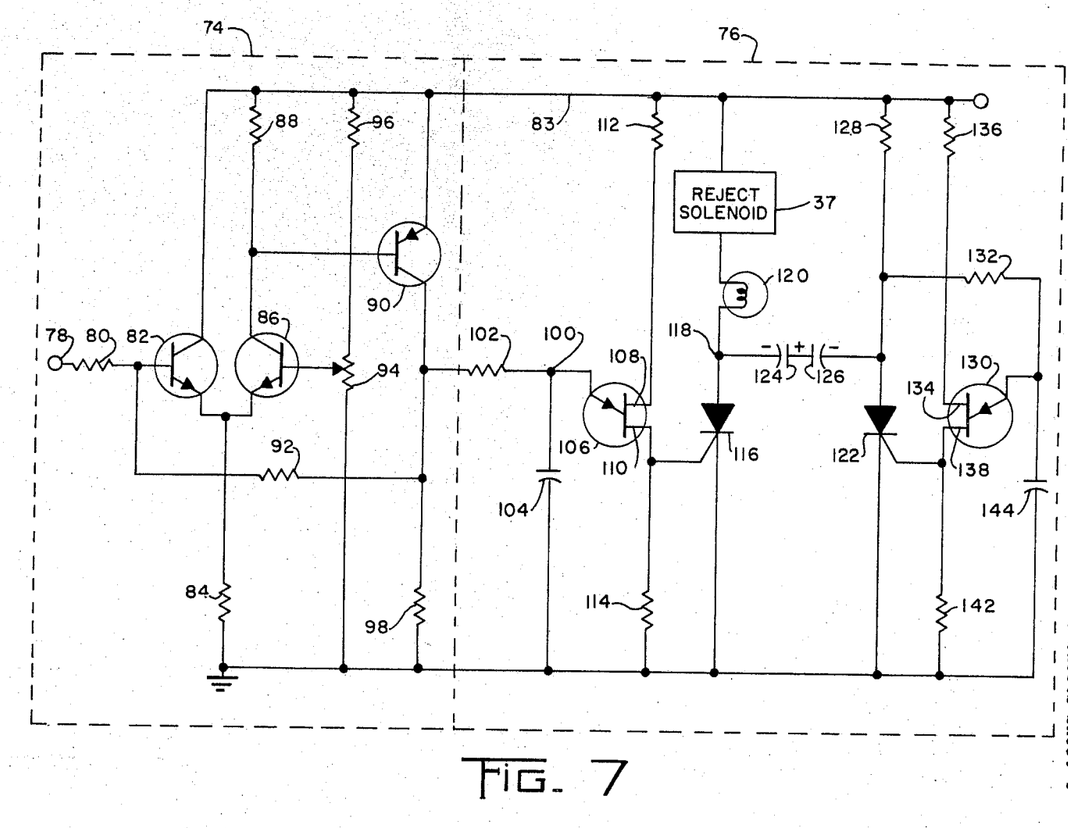
FIGURE 7 is a schematic circuit diagram of the combination of a feedback amplifier and a reject circuit of the invention.

A reject arm 35 located over belt 11 and spaced from the inspection station in the direction of travel of the belt and in the path of containers 10 traveling on the belt, is positioned to reject faulty containers from the belt upon receiving a reject signal from the reject circuit shown in FIGURE 7 to be described. Reject arm 35 is shown in solid lines in its reject position and in dotted lines in its normal position. It is constructed similar to indexing arm 13 and also is preferably covered with a non-abrasive material 20, as described above. Reject arm 35 is mounted for oscillatory motion on the shaft 36 of a D.C. rotary solenoid 37. D.C. rotary solenoid 37 is controlled by pulses from a reject circuit shown in FIGURE 7 to be described. Upon impulse, reject arm 35 moves into the path of a container 10 as shown and deflects a container 10 off of belt 11 through a space or broken portion in the guard rail 12.

A mercury lamp 38 is mounted in a probe 39 extending from a member 40. A control box 41 containing circuitry of the invention is also attached to member 40. A double-action air cylinder 42 is operably connected to member 40 and arranged to reciprocate member 40 vertically up and down, so as to simultaneously raise or lower mercury lamp 38 and control box 41. Air cylinder 42 is controlled by circuitry similar to that shown in FIGURE 4 having a different time setting but actuated by a delayed signal passed by microswitch 16. A guide member 43 is attached to one end of member 40 and slidably passes through a bracket 44 attached to a frame 45, thereby maintaining the alignment of member 40 with air cylinder 42 during its reciprocal movement.

An ultraviolet light beam 46 is directed by mercury lamp 38 towards sidewall 47 of container 10. A lens 48 is attached to control box 41 and directed toward the outside of sidewall 47 of container 10. Lens 48 is arranged to receive the penetrating portion 49 of beam 46 which passes through a given area 50 on a sidewall 47 of container 10. Area 50 represents the area on sidewall 47 upon which lens 48 is focused. Lens 48 focuses penetrating portion 49 onto a filter 51 mounted upon the optical axis of lens 48. Light passing through filter 51 is received by photomultiplier tube 53 also mounted on the optical axis of lens 48. Additional circuitry employed in the invention and located in control box 41 is described broadly with reference to FIGURE 5.

Figure 5:
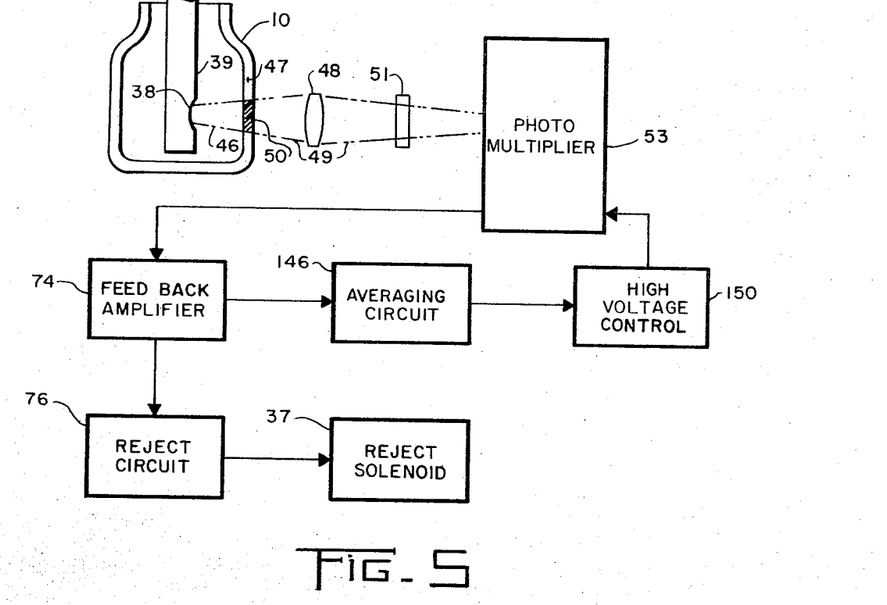
FIGURE 5 is a schematic block diagram of apparatus of the invention.

Referring now to FIGURE 5, photomultiplier tube 53 is connected to a feedback amplifier 74 which feeds a voltage to a reject circuit 76. D.C. rotary solenoid 37 is coupled to reject circuit 76 and arranged to operate reject arm 35 shown in FIGURES 1 and 2 for moving a defective container 10 from the conveyor belt 11. Connected between amplifier 74 and photomultiplier tube 53 in feedback relationship is an averaging circuit 146 feeding a voltage received from amplifier 74 into a high voltage oscillator 150 which is coupled to the anode and the dynodes of photomultiplier tube 53 to complete a feedback circuit.

Photomultiplier tube 53 is of standard construction including an anode, a cathode, and a plurality of dynodes, and being arranged for receiving a controlled high voltage from high voltage control, or oscillator 150, a circuit covering all of the above being shown below in FIGURE 6. The anode of photomultiplier tube 53 is connected to feedback amplifier 74 which is of conventional construction and is arranged so that a negative feedback signal controls the gain of the amplifier. A variable base bias resistor is employed in the feedback amplifier 74 in a well-known manner in order to set the amplification level of the amplifier to a preselected value, therefore combining with the reject circuit to perform a signal monitoring and level discrimination function. Averaging circuit 146 is a resistance-capacitance circuit having a built-in time constant and arranged to receive a voltage and average its amplitude over a period of time regulated by the time constant of the resistance-capacitance circuit. Thus, a voltage having an amplitude equal to the average amplitude of the voltage from feedback amplifier 74 over the period of time regulated by the time constant is fed by averaging circuit 146 into high voltage oscillator 150 (which might also be referred to as a high voltage servo). Oscillator 150 receives the voltage from averaging circuit 146, compares the voltage with a fixed preselected level, and amplifies the resulting voltage difference into a relatively high voltage which is applied to the dynodes of photomultiplier tube 53.

Figure 6:
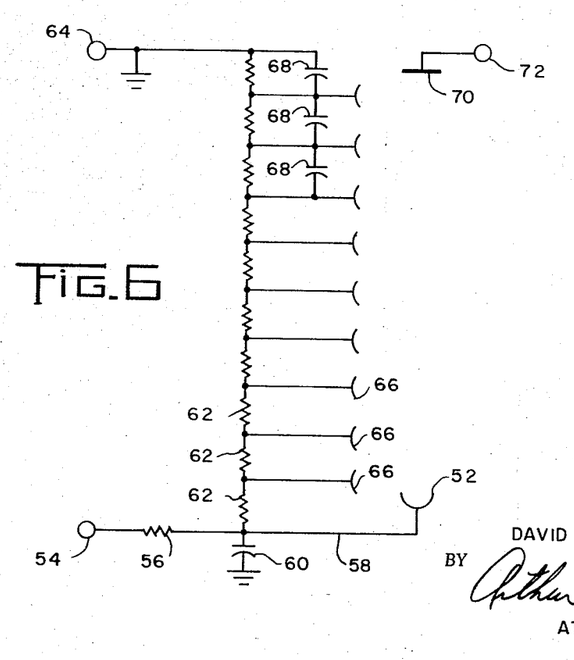
FIGURE 6 is a schematic circuit diagram of a photomultiplier tube circuit employed in the invention.

FIGURE 6 is a schematic circuit diagram of a photomultiplier tube employed with the invention. A photocathode 52 is connected to a source of controlled negative high voltage (not shown) at terminal 54 through resistor 56. A wire 58 between anode 52 and resistor 56 is coupled to ground through capacitor 60. Wire 58, connecting resistor 56 and anode 52, is also connected to a plurality of resistors 62 in series with each other, the last resistor being connected to a ground terminal 64. At the interconnecting point of each resistor 62, there is connected a dynode 66. The three resistors 62 most remote from wire 58 each have a capacitor 68 connected in parallel and across the respective dynodes 66. An anode 70 is spaced from photocathode 52 and connects to output terminal 72.

In operation, when photocathode 52 releases a charge of electrons towards anode 70 upon excitation, the charge of electrons is multiplied through the action of the stepped-up voltage difference between dynodes 66 resulting in an amplified charge pulse received at cathode 70 and appearing as an output voltage signal at terminal 72.

Referring now to FIGURE 7, there is shown a combined schematic circuit diagram which illustrates both an amplifier circuit 74 and a reject circuit 76, which are employed in the invention. The signal from output terminal 72 from the photomultiplier circuit shown in FIGURE 6 is fed into input terminal 78. A resistor 80 connects input terminal 78 with the base of a transistor 82 which has its collector connected to a voltage supply 83 (shown as a supply lead in FIGURE 7) and its emitter connected to ground through a resistor 84. The emitter of transistor 82 is also connected to the emitter of a transistor 86, whose collector is connected to voltage supply 83 through resistor 88 and to the base of a transistor 90. The emitter of transistor 90 is connected to voltage supply 83 and its collector is connected to the base of transistor 82 through resistor 92 in feedback relationship. The base of transistor 86 is also connected to the movable tap of a variable potentiometer 94 which has one end connected to ground and the other end connected to voltage supply 83 by means of resistor 96. The collector of transistor 90 is also connected to ground through resistor 98 and to junction point 100 through resistor 102 which forms a part of reject circuit 76.

Thus, it can be seen that transistors 82, 86 and 90 form a three-stage feedback amplifier which serves as a current amplifier, the input to which is derived from the cathode 70 of the photomultiplier tube and the output of which is obtained at the collector of transistor 90.

Junction point 100 located within reject circuit 76 is connected to ground through capacitor 104. Thus, resistor 102 and capacitor 104 determine the highest frequencies of the signal passed by the system. Junction point 100 is also coupled to the emitter of unijunction transistor 106 having a first base 110 and a second base 108. Base 108 is connected to voltage supply 83 through resistor 112 and base 110 is connected to ground through resistor 114. Base 110 is also connected to the gate electrode of a silicon controlled rectifier 116 which has its cathode connected to ground. The anode of silicon controlled rectifier 116 is fed to junction point 118 from which a signal may be obtained to light a signal light such as 120 or to operate another device such as the rotary solenoid 37 controlling reject arm 35 shown in FIGURE 2. Junction point 118 is connected to the anode of a silicon controlled rectifier 122 through a pair of series-connected capacitors 124 and 126. The cathode of silicon controlled rectifier 122 is connected to ground. The anode of silicon controller rectifier 122 is also connected to voltage supply 83 through resistor 128 and to the emitter of another unijunction transistor 130 through resistor 132. Unijunction transistor 130 has a first base 134 connected to voltage supply 83 through resistor 136 and a second base 138 connected to ground through resistor 142. Base 138 is also connected to the gate electrode of silicon controlled rectifier 122. The emitter of unijunction transistor 130 is also connected to ground through capacitor 144.

In operation, the signal received at junction point 100 fires unijunction transistor 106 when a predetermined voltage level is attained. Silicon controlled rectifier 116 is normally nonconducting but fires and becomes conducting when a signal is received through its gating electrode from unijunction transistor 106. The signal passing through silicon controlled rectifier 116 is used to light lamp 120 and to operate rotary solenoid 37 controlling reject arm 35 shown in FIGURE 2. Silicon controlled rectifier 122 is normally conducting but becomes nonconducting temporarily when silicon controlled rectifier 116 fires. Resistor 132 and capacitor 144 control the time period for which silicon controlled rectifier 122 stays nonconducting and then pass a signal which fires unijunction transistor 130 turning silicon controlled rectifier 122 back to a conducting state. This, in turn, makes silicon controlled rectifier 116 nonconducting, thus turning out lamp 120, switching reject arm 35 back to its normal position shown in FIGURE 2. This prepares the circuit for operation again and another rejection signal.

Figure 8:
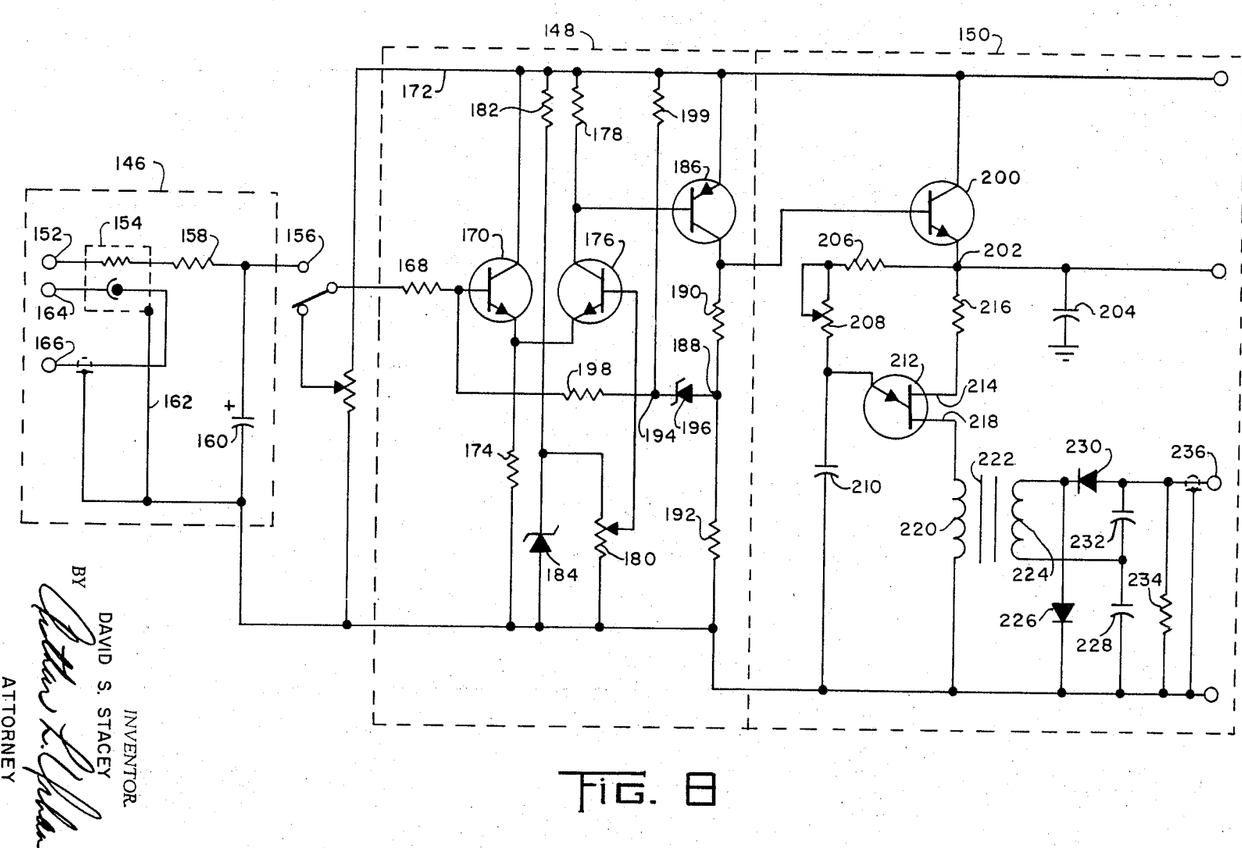
FIGURE 8 is a schematic circuit diagram of the combination of an averaging circuit, an amplifier, and a high voltage oscillator of the present invention.

Referring now to FIGURE 8, there is shown an averaging circuit 146, another three-stage feedback amplifier 148, and a high voltage oscillator 150, all of which are incorporated in the invention. A signal from the collector of transistor 90 in amplifier 74 is received at input terminal 152 and fed into a Raysistor 154 which feeds a signal to terminal 156 through resistor 158. Raysistor 154 may be of the type manufactured by the Raytheon Company. Terminal 156 is connected to ground through capacitor 160. Raysistor 154 is connected to ground through wire 162. Another circuit through Raysistor 154 flows from terminal 164 to terminal 166 and acts like a switch for Raysistor 154 when a microswitch, such as switch 16 shown in FIGURE 2, is tripped by indexing arm 13 indicating that an article such as a container 10 is passing through a predetermined point prior to being inspected. In this manner, current is only passed through Raysistor 154 when an article is being inspected. Resistor 158 and capacitor 160 form an averaging circuit and are used to determine the time constant of the feedback loop of the invention through the servo circuit to the anode of the photomultiplier tube. In apparatus constructed in accordance with the invention for inspecting glass containers of average size, it has been found convenient to employ a resistor 158 and a capacitor 160 of a size which will provide a time constant for the feedback loop of about 200 seconds.

The output of the averaging circuit 146 received at terminal 156 is fed into a three-stage transistor feedback amplifier 148 which is similar to amplifier 74 except that this amplifier realizes a high gain and therefore a higher level output signal. Thus, the signal from terminal 156 is fed into resistor 168 and into the base of a transistor 170, the collector of which is connected to a voltage supply 172 (shown as a supply lead in FIGURE 8) and the emitter of which is connected to ground through a resistor 174. The emitter of transistor 170 is also coupled to the emitter of a transistor 176 whose collector is connected to voltage supply 172 through resistor 178. The base of transistor 176 is also connected to the tap of a potentiometer 180, one end of which is connected to ground and the other end of which is connected to voltage supply 172 through resistor 182 and to the anode of a zener diode 184 whose cathode is coupled to ground. The collector of transistor 176 is also connected to the base of a transistor 186, the emitter of which is coupled to voltage supply 172. The collector of transistor 186 is connected to a junction point 188 through a resistor 190. Junction point 188 is connected to ground through a resistor 192 and to a junction point 194 through a zener diode 196. Junction point 194 is connected to the base of transistor 170 through a resistor 198 and to voltage supply 172 through resistor 199. Increased gain is realized by amplifier 148 through the use of zener diode 184 and zener diode 196. The output from amplifier 148 is obtained at the collector of transistor 186 and fed into a high voltage oscillator 150.

The signal from the collector of transistor 186 is fed to the base of a transistor 200, the collector of which is connected to voltage supply 172, the emitter of which is fed to junction point 202. Transistor 200 serves to drive high voltage oscillator 150. Junction point 202 is connected to ground through a capacitor 204. A resistor 206, a variable resistor 208, a capacitor 210, and a unijunction transistor 212, constitute a relaxation oscillator. Resistor 206 and variable resistor 208 are series connected between the emitter of unijunction transistor 212 and junction point 202. Capacitor 210 has one terminal connected to the emitter of unijunction transistor 212 and the other terminal connected to ground. A second base 214 of unijunction transistor 212 is connected to junction point 202 through resistor 216. A first base 218 of unijunction transistor 212 is connected to ground through a primary coil 220 of a transformer 222. A secondary coil 224 of transformer 222 cooperates with primary coil 220 to form a step-up transformer.

A voltage doubling circuit is connected across secondary coil 224. Thus, a diode 226, a capacitor 228, a diode 230 and a capacitor 232 form a circuit known as a voltage doubler which is connected to each end of secondary coil 224. A resistor 234 is connected across the voltage doubler and a controlled high voltage is thus generated at terminal 236. This high voltage is fed back into terminal 54 of the photomultiplier circuit described in FIGURE 6 and is the voltage supplied to the dynodes of the photomultiplier tube.

In operation, capacitor 210 is charged by current from high voltage supply 172, passing through resistor 206 and variable resistor 208. When the charge on capacitor 210 reaches a predetermined value, unijunction transistor 212 switches from a high impedance state to a low impedance state, and capacitor 210 is rapidly discharged through transistor 212 and through base 218 into primary coil 220 and to ground. Current is supplied from voltage supply 172 through junction point 202 and through resistor 216 to base 214 to operate unijunction transistor 212 when its stable negative resistance breaks down. At this time, the stored energy of capacitor 210 appears as a pulse passing through primary coil 220 to ground and capacitor 210 starts to charge again. The cycle repeats at a rate determined by the charging rate of capacitor 210 which is regulated by the setting of variable resistor 208. A current through primary coil 220 of transformer 222 induces a potential across secondary coil 224.

Rapid operation of the relaxation oscillator maintains a rapidly oscillating high voltage across diodes 230 and 236. The output voltage approaches a steady state voltage due to the action of capacitors 228 and 232.

Although ultraviolet light has been employed in the embodiment of the invention described herein, it should be understood that any radiation, whether in the visible or invisible portion of the spectrum, may be employed providing that such radiation is measurably and partially absorbed by the material to be inspected For example, infrared or white light could be used. It has been found that ultraviolet light falling within particular wavelengths of the spectrum is absorbed to a greater degree and gives better results with the invention than ultraviolet light of other wavelengths. Specifically, ultraviolet light having a wavelength of between about 2,900 Angstroms and 3,100 Angstroms are preferred with the invention. Although many kinds of mercury lamps may be employed to furnish ultraviolet light within the above specified wavelength range, a preferred source is the Penray 11SC1, manufactured by Ultra Violet Products, Inc. This source produces strong ultraviolet lines at wavelengths of 2,965 Angstroms, 3,022 Angstroms, and 3,126 Angstroms, and above. In addition, the output of this mercury lamp is fairly constant.

The lens employed with the invention was a quartz lens of sufficient size to receive substantially all of the beam emitted by the mercury lamp. It is well known that the sidewall of a cylindrical transparent container acts as a lens and tends to bend light rays directed against one side of the wall as they pass through the wall, except those which strike the wall directly perpendicular. Therefore, the lens on the opposite side of the sidewall advantageously is sufficiently large to catch most of the light rays including those which are bent. These rays are then directed toward a slit or adjustable window opening in the photomultiplier tube. It should be noted that it is not essential that all of the beam received by the lens be directed at the photomultiplier tube since the proportion of a given beam which is received by the photomultiplier tube will remain constant, once the equipment has been set up, thereby assuring constant operating results. However, it is desirable to direct at least the larger portion of the beam toward the photomultiplier tube in order to increase the output signal strength.

The filter which is interposed between the lens and the photomultiplier tube advantageously is selected with care in order to achieve optimum results for a particular type of glass. For amber glass, a Corning 7–54 filter manufactured by Corning Glass Works, provides very good absorption characteristics. This filter peaks at about 3,200 Angstroms, which is slightly above the ideal ultraviolet wavelength, but drops down to 10 percent absorption at 4,000 Angstroms. It is essentially opaque at 4,200 Angstroms. Thus with amber glass, employing the above filter in the present invention, the system showed an effective absorption coefficient of $(0.024 \text{ in.})^{-1}$. This indicates that 37 percent of the light is left after passing 0.024 inch, and shows that 0.005 inch gives a 19 percent change in output.

For flint glass, operable results were obtained with an interference filter manufactured by Thin Film Products. This filter passes 2,965 Angstroms and rejects the undesired 3,130 Angstroms by a factor of more than 100. Both of the above filters were chosen to operate in the region where the absorption of ultraviolet light by the particular glass is relatively high.

The photomultiplier tube employed above puts out about 0 to 10 microamperes with about 700 volts on the dynodes. The amplifier is arranged to put out approximately one volt per microampere but has an adjustable level control described above to shift this, for example to about 4 to 14 volts. The reject circuit is arranged to fire whenever the signal reaches 13.2 volts. It puts out a pulse of about 1 ampere at 10 volts.

It has been found that if the average circuit is arranged by setting the time constant incorporated therein to average the signal transmission over several hundred bottles, or over the time period required by several hundred bottles to pass the inspection station, a very good measure of average thickness is provided. Thus, it has been discovered that the uncontrollable variations of the light source intensity and the composition of the glass drift very slowly over a relatively long period of time; that is, a period of time represented by the time required for several hundred bottles to pass the inspection station which could be up to five minutes or more. In the invention described above, the averaging circuit employed in the feedback loop has a time constant of about three minutes and is arranged so that if the average voltage changes from 8 volts, for example, the high voltage oscillator would change the gain of the photomultiplier tube to correct or compensate for this change in voltage by changing the high voltage supplied to the dynodes of the photomultiplier tube. In this way, the continually acting feedback circuit, using the average of many measurements made over a previous period of time, constantly recalibrates the whole system.

It can be seen from the above discussion and drawings that the present invention can be employed as a thin spot detector in many different applications. For example, the circuit of the invention could be used in an arrangement to inspect sheets of material directly on the production line where the sheets are disposed horizontally on a conveyor or other transfer means. In addition, the invention can be employed to inspect containers or articles of a more complex configuration such as the containers shown in the drawings. Furthermore, the present invention operates reliably in applications where the material from which an article is formed gradually varies in composition over a relatively long time interval or where the light source diminishes in intensity over a considerable period of time.

It will be apparent from the above description that various modifications in the apparatus described may be made within the scope of the invention. For example, many different types of scanning apparatus could be employed for passing the beam of light over the surface of an article to be inspected for a thin spot. Furthermore, a different arrangement could be used to provide ultraviolet light of a particular wavelength for measurement such as employing a monochrometer instead of a mercury lamp to generate a beam of light having a particular wavelength and thus eliminating the necessity for a filter on the optical axis of the lens and in front of the photomultiplier tube. Therefore, the invention is not intended to be limited to the specific details described herein, except as may be required by the following claims.

What is claimed is:

1. A method for detecting a thin spot in transparent and semi-transparent material comprising the steps of directing a light beam toward said material, creating relative motion between said material and said light beam, receiving said light beam which passes through said material, converting said received light beam into a first voltage indicative of the instantaneous intensity of the light passing through said material, generating a second voltage indicative of the average intensity of said received light beam over a previously preselected period of time, comparing said second voltage with a fixed voltage so as to generate a difference voltage, controlling the conversion of said received light beam into said first voltage with said difference voltage, and monitoring said first voltage to determine whether it falls outside of a preselected range thereby indicating the presence of a thin spot.

2. A method for detecting a thin spot in transparent and semi-transparent material comprising the steps of directing a light beam toward said material, creating relative motion between said material and said light beam so as to completely scan a surface of said material with said light beam, receiving a substantially fixed portion of said light beam which passes through said material, converting the received portion of said light beam into a first voltage indicative of the instantaneous intensity of said received portion, generating a second voltage indicative of the average intensity of said received portion over a previous preselected period of time, comparing said second voltage with a fixed voltage so as to obtain a difference voltage, controlling the conversion of said received portion into said first voltage with said difference voltage, and monitoring said first voltage to determine whether it falls outside of a preselected range thereby indicating the presence of a thin spot.

3. A method for detecting a thin spot in transparent and semi-transparent material comprising the steps of directing a light beam toward said material, creating relative motion between said material and said light beam, receiving a substantially fixed portion of said light beam which passes through said material, converting the received portion of said light beam into a first voltage indicative of the instantaneous intensity of said received portion, amplifying said first voltage, generating a second voltage indicative of the average intensity of said received portion over a previous preselected period of time, comparing said second voltage with a fixed voltage so as to obtain a difference voltage, amplifying said difference voltage, controlling the conversion of said received portion into said first voltage with said amplified difference voltage, and monitoring said amplified first voltage to determine whether it falls outside of a preselected range thereby indicating the presence of a thin spot.

4. A method for detecting a thin spot in transparent and semi-transparent material comprising the steps of directing an ultraviolet light beam toward said material, creating relative motion between said material and said light beam so as to completely scan a surface of said material with said beam, receiving a substantially fixed portion of said light beam which passes through said material, converting the received portion of said light beam into a first voltage having an amplitude indicative of the instantaneous intensity of said received portion, amplifying said first voltage, generating a second voltage having an amplitude indicative of the average intensity of said received portion over a previous preselected period of time, comparing said second voltage with a fixed voltage so as to generate a difference voltage, amplifying said difference voltage, controlling the conversion of said received portion into said first voltage with said amplitude difference voltage, and monitoring said amplified first voltage to determine whether it falls outside of a preselected range thereby indicating the presence of a thin spot.

5. A method for detecting a thin spot in the sidewall of a container comprising the steps of directing a light beam toward said sidewall, creating relative motion between said sidewall and said light beam so as to completely scan a sidewall of said container with said beam, receiving a substantially fixed portion of said light beam which passes through said sidewall, converting the received portion of said light beam into a first voltage indicative of the instantaneous intensity of said received portion, amplifying said first voltage, generating a second voltage indicative of the average intensity of said received portion over a previous preselected period of time, comparing said second voltage with a fixed voltage so as to obtain a difference voltage, amplifying said difference voltage, controlling the conversion of said received portion into said first voltage with said amplified difference voltage, and monitoring said amplified first voltage to determine whether it falls outside of a preselected range thereby indicating the presence of a thin spot in the sidewall of said container.

6. A method for inspecting a sidewall of a cylindrical glass container to determine the presence of a thin spot therein, comprising the steps of presenting a cylindrical glass container in an upright position at an inspection station, moving a light beam directed toward the sidewall of said rotating container along a vertical axis of said container so as to completely scan the sidewall of said rotating container with said beam, receiving a substantially fixed portion of said light beam which passes through said sidewall, converting the received portion of said light beam into a first voltage indicative of the instantaneous intensity of said received portion, amplifying said first voltage, generating a second voltage indicative of the average intensity of said received portion over a previous preselected period of time, comparing said second voltage with a fixed voltage so as to obtain a difference voltage, amplifying said difference voltage, controlling the conversion of said received portion into said first portion with said amplified difference voltage, and monitoring said amplified first voltage to determine whether it falls outside of a preselected range thereby indicating the presence of a thin spot in the sidewall of said container.

7. Apparatus for detecting a thin spot in transparent and semi-transparent material comprising means for directing a light beam toward said material, means for creating relative motion between said material and said light beam, means for receiving said light beam which passes through said material and for converting said received light beam into a first voltage indicative of the instantaneous intensity of the light passing through said material, means for generating a second voltage indicative of the average intensity of said received light beam over a preselected period of time, means for comparing said second voltage with a fixed voltage so as to generate a difference voltage, means for controlling the conversion of said received light beam into said first voltage with said difference voltage, and means for monitoring said first voltage to determine whether it falls outside of a preselected range thereby indicating the presence of a thin spot.

8. Apparatus for detecting a thin spot in the sidewall of a container comprising means for directing an ultraviolet light beam toward the sidewall of said container, means for creating relative motion between the sidewall of said container and said light beam so as to scan completely a surface of said sidewall, a photomultiplier tube arranged for receiving a substantially fixed portion of said light beam which passes through said sidewall and converting the received portion of said light beam into a first voltage indicative of the instantaneous intensity of said received portion, an averaging circuit for receiving said first voltage and arranged to generate a second voltage indicative of the average intensity of said received portion over a preselected period of time, a high voltage control arranged to compare said second voltage with a fixed voltage so as to obtain a difference voltage and to amplify said difference voltage, circuit means arranged to control the conversion of said received portion into said first voltage within said photomultiplier tube by means of said amplified difference voltage, and a reject circuit for monitoring said first voltage to determine whether it falls outside a preselected range thereby indicating the presence of a thin spot.

9. Apparatus for detecting a thin spot in the sidewall of a container comprising means for directing an ultraviolet light beam toward the sidewall of said container, means for creating relative motion between the sidewall of said container and said light beam so as to scan completely a surface of said sidewall, a photomultiplier tube arranged for receiving a substantially fixed portion of said light beam which passes through said sidewall and converting the received portion of said light beam into a first voltage indicative of the instantaneous intensity of said received portion, means for amplifying said first voltage, an averaging circuit receiving said amplified first voltage and arranged to generate a second voltage indicative of the average intensity of said received portion over a preselected period of time, a high voltage control arranged to compare said second voltage with a fixed voltage so as to obtain a difference voltage and to amplify said difference voltage, circuit means arranged to control the conversion of said received portion into said first voltage within said photomultiplier tube by means of said amplified difference voltage, and a reject circuit for monitoring said first voltage to determine whether it falls outside of a preselected range thereby indicating the presence of a thin spot.

10. Apparatus for detecting a thin spot in transparent and semi-transparent material comprising a mercury lamp arranged to direct a beam of ultraviolet light toward said material, means for creating relative motion between said material and said ultraviolet light beam, a lens disposed on the opposite side of said material and arranged to receive the penetrating portion of said light beam which passes through said material, and for projecting said penetrating portion into a converging light beam, a photomultiplier tube, filtering means disposed between said lens and said photomultiplier tube and arranged to intercept the projected penetrating portion of said beam and to pass only light falling within a preselected wave band, a feedback amplifier connected to the output of said photomultiplier tube, an averaging circuit connected to said feedback amplifier and arranged to generate a voltage having an amplitude equal to the average amplitude of the voltage from said photomultiplier tube over a preselected period of time, a control circuit connected to the output of said averaging circuit including means for comparing said output voltage with a fixed voltage so as to generate a difference voltage, said control circuit being connected in feedback relationship to said photomultiplier tube and arranged to control the voltage supplied to said photomultiplier tube so as to control the amplitude of said first voltage with said difference voltage, and reject circuit means for monitoring said first voltage to determine whether it falls outside of a preselected range thereby indicating the presence of a thin spot.

11. Apparatus for inspecting the sidewall of a cylindrical glass container to determine the presence of a thin spot therein, comprising conveying means for transferring glass containers in an upright position to an inspection station, means for rotating said container about its vertical axis, a mercury lamp arranged to direct a beam of ultraviolet light toward the sidewall of said container, penetrating portion of said ultraviolet light beam which passes through the sidewall of said container and for projecting said penetrating portion into a converging light beam, a photomultiplier tube, filtering means disposed between said lens and said photomultiplier tube and arranged to intercept the projected penetrating portion of said beam and to pass only light falling within a preselected wave band, a feedback amplifier connected to the output of said photomultiplier tube, an averaging circuit connected to said feedback amplifier and arranged to generate a voltage having an amplitude equal to the average amplitude of the voltage from said photomultiplier tube over a preselected period of time, a control circuit connected to the output of said averaging circuit including means for comparing said output voltage with a fixed voltage so as to generate a difference voltage, said control circuit being connected in feedback relationship to said photomultiplier tube and arranged to control the voltage supply to said photomultiplier tube so as to control the amplitude of said first voltage with said difference voltage, and reject circuit means for monitoring said first voltage to determine whether it falls outside a preselected range thereby indicating the presence of a thin spot.

References Cited

UNITED STATES PATENTS

| | | | |
|---|---|---|---|
| 2,735,017 | 2/1956 | Beard et al. | 250—52 |
| 2,890,347 | 6/1959 | McCormick | 250—83.3 X |
| 3,030,516 | 4/1962 | Seavey | 88—14 X |

ARCHIE R. BORCHELT, *Primary Examiner.*